US012212110B2

(12) United States Patent
Zebhauser et al.

(10) Patent No.: US 12,212,110 B2
(45) Date of Patent: Jan. 28, 2025

(54) METHOD AND CABLE FABRICATION DEVICE FOR ASSEMBLING A CABLE CONNECTOR

(71) Applicant: Rosenberger Hochfrequenztechnik GmbH & Co. KG, Fridolfing (DE)

(72) Inventors: Martin Zebhauser, Laufen (DE); Till Bredbeck, Siegsdorf (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 18/119,665

(22) Filed: Mar. 9, 2023

(65) Prior Publication Data

US 2023/0216263 A1 Jul. 6, 2023

Related U.S. Application Data

(62) Division of application No. 17/295,232, filed as application No. PCT/EP2019/082286 on Nov. 22, 2019, now Pat. No. 11,616,335.

(30) Foreign Application Priority Data

Nov. 28, 2018 (EP) .................................... 18208816

(51) Int. Cl.
*H01R 43/20* (2006.01)
*H01R 24/40* (2011.01)
*H01R 43/048* (2006.01)

(52) U.S. Cl.
CPC ............. *H01R 43/20* (2013.01); *H01R 24/40* (2013.01); *H01R 43/048* (2013.01); *H01R 2201/26* (2013.01); *Y10T 29/49185* (2015.01)

(58) Field of Classification Search
CPC .... H01R 43/048; H01R 13/514; H01R 43/20; H01R 43/28; H01R 13/33;
(Continued)

(56) References Cited

U.S. PATENT DOCUMENTS 9,667,000 B1 * 5/2017 Morello ................ H01R 24/38

FOREIGN PATENT DOCUMENTS

| | | | |
|---|---|---|---|
| EP | 3255741 | A1 | 12/2017 |
| JP | 2009146840 | A | 7/2009 |
| WO | 201216377 | A1 | 2/2012 |

OTHER PUBLICATIONS

European Search Report dated May 31, 2019.
Miscellaneous PCT/EP2019/082286Documents.

* cited by examiner

*Primary Examiner* — Thiem D Phan
(74) *Attorney, Agent, or Firm* — Randall Danskin P.S.

(57) ABSTRACT

A method for assembling a cable connector which has an outer conductor part, and insulating part and an electrical cable that is prefabricated with an inner conductor part. In a first method step, the insulating part is introduced into the outer conductor part by relative movement between the insulating part and the outer conductor part. In a second method step, before or at least partially during the first method step, the electrical cable is prefabricated to have an inner conductor part secured on an inner conductor of the cable. In a third method step, during or after the first method step, the prefabricated cable is introduced into the insulating part up to a defined axial terminal position. The positions of the inner conductor part, the outer conductor part and/or the insulating part are fixed relative to each other by compressing the outer conductor part at least partly.

11 Claims, 5 Drawing Sheets

(58) Field of Classification Search
CPC ..... A61B 2018/00178; Y10T 29/49174; Y10T 29/49181; Y10T 29/49185; Y10T 29/5193; Y10T 29/53209; Y10T 29/53213; Y10T 29/53417
USPC ........................... 29/863, 857, 858, 874, 876
See application file for complete search history.

METHOD AND CABLE FABRICATION DEVICE FOR ASSEMBLING A CABLE CONNECTOR

CROSS REFERENCE TO RELATED APPLICATIONS

This US Utility patent application is a Divisional application of co-pending U.S. Utility patent application Ser. No. 17/295,232, filed May 19, 2021, titled "Method and Cable Fabrication Device for Assembling a Cable Connector", for which a Notice of Allowance (NOA) has been issued by the USPTO, and which is fully and completely incorporated herein by reference. This Divisional patent application also claims priority to earlier filed PCT Patent Application No. PCT/EP2019/082286 which was filed on 22 Nov. 2019, and also claims priority to earlier filed European Patent Application No. 18 208 816.1 which was filed on 28 Nov. 2018. Both earlier filed patent applications are titled "Method and Cable Fabrication Device for Assembling a Cable Connector". The aforementioned and identified Co-Pending US Utility patent application, the PCT Patent Application, and the aforementioned and identified European Patent Application are all hereby expressly incorporated herein by this reference in their entireties.

The inventorship of this Divisional patent application is the same as the inventorship of co-pending U.S. Utility patent application Ser. No. 17/295,232, and its related earlier filed applications to which it claims priority.

Pursuant to USPTO rules, the claims of priority are also set forth in the Application Data Sheet (ADS) filed contemporaneously herewith.

BACKGROUND AND SUMMARY

The invention relates to a method for assembling a cable plug connector that comprises an outer conductor part, an insulation part and an electrical cable that is prefabricated with an inner conductor part. The invention relates furthermore to a cable fabrication apparatus for assembling a cable plug connector.

Furthermore, the invention also relates to a second method for assembling a cable plug connector that comprises an outer conductor part, an insulation part and an electrical cable that is prefabricated with an inner conductor part. The invention also relates, within this framework, to a second cable fabrication apparatus for assembling a cable plug connector.

During the procedure of fabricating electrical cables, the conductors of said electrical cables are typically connected to a plug connector. The plug connector can be a connector, a coupler or an adaptor. The term "plug connector" used within the scope of the invention is representative for all variants.

A plug connector is used for the purpose of producing an electrical connection to a correspondingly complementary further plug connector. (e.g. a mating plug connector).

High demands with regard to robustness and reliability of the plug connection are placed in particular on plug connectors for the automotive industry or for vehicles. Consequently, a plug connection must remain intact and defined as closed in the presence of high loads, for example mechanical loads or thermal loads, to prevent the electrical connection from being unintentionally separated, for example during the operation of a vehicle. It is a priority to ensure safety and reliability particularly in the case of an (in part) autonomous operation of vehicles and for assist systems.

Furthermore, the demands placed on plug connectors and cable connections, in particular also within a vehicle, with regard to the required data rate are meanwhile very high. It is sometimes necessary, for example during the autonomous operation of a vehicle or during the use of assist systems, for high volumes of data from multiple cameras, various sensors and navigation sources to be combined with one another and transported, usually in real time. Accordingly, an efficient infrastructure in the vehicle electronic system is required for the operation of many devices, screens and cameras.

In addition to the mentioned mechanical and electrical demands, it is simultaneously important—so as to save on installation space and weight—to embody the plug connectors in as compact a manner as possible. During the procedure of fabricating cables and during the production of the individual parts of the plug connection, it is consequently comparatively challenging to maintain the entire required tolerance ranges.

During the procedure of fabricating a cable, inter alia a support sleeve is crimped onto the cable. Moreover, an inner conductor contact element (inner conductor part) is crimped onto the inner conductor of the cable. Due to inaccuracies or tolerances in these assembly steps, individual prefabricated cables can have, for example, a different distance between the connector-side end of the inner conductor part (i.e. the front, free end of the inner conductor part or the end of the inner conductor part that is facing a mating plug connector) and a front (connector-side) end of the support sleeve that is facing the inner conductor part. In particular, due to the above mentioned high mechanical and electrical demands placed on the plug connection, it is necessary for corresponding dimensions to have an ideal measurement or at least to fall within a predetermined tolerance range in order to ensure a sufficiently high quality of the subsequent plug connection.

The high demands placed on the plug connections require, in particular within the scope of mass production, generally a plug connector assembly procedure that is spread across multiple cable fabrication devices or machines. The fact that the necessary assembling tolerances are to be maintained can increase the demands placed on the individual cable fabrication apparatuses and on the production line as a whole and finally above all severely push up the production costs.

Consequently, the object of the present invention is to simplify the assembly procedure of a cable plug connector, in particular to improve the cost-effectiveness of the assembly procedure of a cable plug connector.

A method for assembling a cable plug connector is provided, wherein the cable plug connector can comprise an outer conductor part, an insulation part and an electrical cable that is prefabricated with an inner conductor part.

Within the scope of the invention, the term a "prefabricated electrical cable" is preferably to be understood to mean a cable in which a cable sheath has been exposed at least in the region of a front, free end of the cable, after which a support sleeve is assembled on the cable and optionally an outer conductor of the cable, preferably an outer conductor shielding braid, has been folded back onto the support sleeve, after which a dielectric is revealed below the outer conductor and at least one inner conductor of the cable has been made accessible, onto which subsequently an inner conductor part is assembled, preferably crimped thereon.

The inner conductor part is the inner contact element of the plug connector that is to be assembled on the electrical cable. Fundamentally, it is also possible within the scope of the invention to provide that an electrical cable is equipped with multiple inner conductors that are, for example, arranged in parallel and have multiple inner conductor parts. However, it is preferred that the invention relates to the fabrication of a coaxial cable that merely comprises a single inner conductor that is guided in an electrically insulated manner within an outer conductor, for example within an outer conductor shield or cable shielding braid.

The outer conductor part is the outer conductor part of the subsequent plug connector. The outer conductor part can also be referred to as the outer conductor contact element, or as the connector body.

The insulation part is embodied in order to safely and reliably separate the inner conductor part and the outer conductor part from one another in the subsequent plug connector and in particular to avoid a short circuit between the inner conductor part and the outer conductor part, preferably also in the event of a mechanical overload of the plug connector or damage to the plug connector.

In accordance with the invention, a first method step is provided that starts at a first method point in time, and ends at a second method point in time. In this first method step, an insulation part is inserted into the outer conductor part by virtue of a relative movement between the insulation part and the outer conductor part.

The phrase “inserting the insulation part into the outer conductor part” is to be understood, within the scope of the invention, to mean a relative positioning of the two components with respect to one another, which subsequently leads to a positioning of the insulation part in the outer conductor part. Consequently, it does not matter whether the insulation part, the outer conductor part or the two parts are moved in order to insert the insulation part into the outer conductor part.

It is fundamentally possible, with respect to all the movement sequences that are still to be described herein within the scope of the invention, to provide a relative movement of the corresponding components, even if this is not explicitly mentioned. It is possible in this manner to improve the flexibility during the assembly procedure.

In accordance with the invention, a second method step is provided that is performed prior to, or at least in part during, the first method step. In this second method step, the electrical cable is prefabricated in such a manner that the inner conductor part is fastened to an inner conductor of the electrical cable.

Within the scope of the procedure of prefabricating the electrical cable that is performed in the second method step, it is also possible to provide in particular even further measures as already indicated above. In particular, it is possible to provide that a support sleeve is fastened to the outer conductor of the electrical cable, preferably crimped thereon. It is fundamentally possible to provide any pre-treatment or pre-processing of the electrical cable during the second method step, which should precede the inner conductor part of the electrical cable being inserted into the outer conductor part of the cable plug connector.

In accordance with the invention, a third method step is provided that is performed during, or after, the first method step. In this third method step, the electrical cable that has been prefabricated with the inner conductor part is inserted, as far as a defined axial end position, into the insulation part by virtue of a relative movement between the inner conductor part and the outer conductor part that is equipped with the insulation part.

It is preferred that the third method step is performed after the first method step.

It is preferred that the first and the second method step take place to a great extent parallel to one another or simultaneously.

It is preferred that the second method step is concluded prior to the end of the first method step.

In accordance with the invention, it is provided that the first method step, the second method step and the third method step are performed in a synchronized cyclic manner within the scope of a time-restricted continuous flow production if the second method step is performed prior to the first method step.

In accordance with the invention, it is provided that the first method step, the second method step and the third method step are performed in a synchronized cyclic manner within the scope of a time-restricted continuous flow production when the second method step is performed prior to the first method step.

In accordance with the invention, the process time of the procedure of prefabricating the cable can consequently be used for a parallel assembly procedure of the cable plug connector using preferably the same cable fabrication device. In this manner, the entire process time and in particular also the investment costs for the cable fabrication device(s) can be reduced.

In accordance with the invention, it is therefore possible to distribute the process or method steps during the cable fabrication procedure. It is hereby possible to shift the time-intensive process of assembling the inner conductor part during the production of the outer conductor part onto the already time-intensive process of prefabricating the cable and to perform this in a parallel manner.

In accordance with the invention, it is hereby possible to realize a shorter project planning exercise during the assembly procedure of the cable plug connector, in particular if the procedure of assembling the insulation part in the outer conductor part is shifted onto the fabrication process.

In one advantageous embodiment of the invention, it is possible to provide that the first method step, the second method step and the third method step are performed in a synchronized cyclic manner within the scope of the time-restricted continuous flow production, in that the method steps start simultaneously and/or end simultaneously.

In accordance with one embodiment of the invention, it is furthermore possible to provide that the first method step, the second method step and the third method step are performed in a synchronized cyclic manner within the scope of the time-restricted continuous flow production, in that the method steps have identical cycle times.

The method steps, and the transport between the production sites, can consequently be performed in the fixed temporal rhythm. As a consequence, the duration of the processing procedure at the individual production sites can be dependent upon one another (“time-restricted continuous flow production”).

In accordance with one embodiment of the invention, it is possible to provide that the position of the inner conductor part, the position of the outer conductor part and/or of the insulation part is fixed relative to one another, in that the outer conductor part is pressed thereon or preferably crimped thereon at least in sections.

For example, a single crimp or crimping can be provided at multiple axial positions in order to fix the insulation part and/or the inner conductor part in the outer conductor part.

In one embodiment of the invention, it is possible to provide that the insulation part is at least axially fixed in the outer conductor part prior to the inner conductor part being inserted into the insulation part. It is preferred that the insulation part is placed, for this purpose, against an inner-lying shoulder of the outer conductor part and subsequently for example crimped thereon.

The insulation part can consequently be fixed at a defined axial position in the outer conductor part even prior to the inner conductor part being inserted into the outer conductor part or into the insulation part. In this manner, the insulation part can also be accommodated in a loss-proof manner in the outer conductor part.

Within the scope of the unified inventive overall concept for achieving the object, the invention relates to a second method for assembling a cable plug connector, wherein the cable plug connector comprises an outer conductor part, an insulation part and an electrical cable that is prefabricated with an inner conductor part.

In accordance with the invention, it is provided for the second method to position the inner conductor part and the insulation part in the outer conductor part. For this purpose, the inner conductor part is inserted as far as a defined axial end position into the insulation part by virtue of a relative movement between the inner conductor part and the insulation part, wherein the insulation part is only fixed in the axial direction relative to the outer conductor part after the inner conductor part is located in the axial end position.

It is hereby possible to orient the position of the insulation part relative to the outer conductor part and also to orient the position of the inner conductor part relative to the outer conductor part almost arbitrarily in an axial manner. Consequently, the second method, in accordance with the invention, comprises a considerably greater flexibility in the axial orientation of the insulation part, of the inner conductor part and of the outer conductor part relative to one another than is the case in the prior art.

It is possible by virtue of the great flexibility of the axial orientation of the three components, relative to one another, to compensate for even large tolerances of the components. Moreover, the impedance at the transition between the cable and the cable plug connector can be optimized.

In accordance with the invention, it is possible for the insulation part that is necessary for assembling the cable plug connector to be provided separately during a cable fabrication process.

It is possible to provide that the inner conductor part is inserted as far as the defined axial end position into the insulation part, in that the inner conductor part is inserted into the insulation part and/or in that the insulation part is pushed over the inner conductor part.

The phrase “as the inner conductor part is inserted into the insulation part” is to be understood, within the scope of the invention, to mean in particular that the components are positioned relative to one another. Consequently, it does not matter whether the inner conductor part, insulation part, or the two parts are moved in order to insert the insulation part into the inner conductor part.

As already mentioned above, it is possible with respect to all the movement sequences that are described within the scope of the invention to provide a relative movement of the corresponding components, even if this is not explicitly mentioned. It is possible in this manner to further improve the flexibility during the assembly procedure.

In accordance with the invention, it is furthermore possible to provide for the second method that the position of the inner conductor part, of the outer conductor part and/or of the insulation part is fixed relative to one another, in that the outer conductor part is pressed thereon or preferably crimped thereon at least in sections.

For example, a single crimp or crimping can be provided at multiple axial positions in order to fix the insulation part and/or the inner conductor part in the outer conductor part.

In one development of the invention, it can be provided that the insulation part remains axially movable in the outer conductor part at least so as to compensate assembling tolerances until the inner conductor part is located in the axial end position in the insulation part.

It is consequently not absolutely necessary within the scope of the invention that the insulation part remains initially freely movable over the full length of the outer conductor part. This does not matter in particular within the scope of the first method. For example, it is possible to provide one or multiple stops in order to limit the axial movement of the insulation part in the outer conductor part in one or two directions by virtue of a positive-locking fit insofar as sufficient freedom of movement remains with regard to compensating the tolerances and/or for an impedance adjustment.

It is to be noted that this development and also the developments and variants and advantages described herein relate to the same extent to the first method and to the second method and inter alia for this reason finally form a unified inventive overall concept.

Furthermore, it is possible in one development of the invention that the insulation part is pre-assembled in the outer conductor part, preferably pre-assembled in a loss-proof manner, prior to the inner conductor part and the insulation part being positioned relative to one another.

For example, it is possible to provide that the insulation part is to be inserted into the outer conductor part by virtue of a relative movement between the insulation part and the outer conductor part and by virtue of subsequently reshaping the outer conductor part in the region of one or both ends of the outer conductor part to prevent in a positive-locking manner the insulation part from falling out. In this manner, the insulation part can still be moved axially in the outer conductor part for the subsequent assembly procedure but can be transported in a loss-proof manner together with the outer conductor part. Within the scope of the first method, it is also possible to provide a complete axial fixing arrangement in order to produce a loss-proof pre-assembly arrangement.

Furthermore, it can be provided in one development of the invention that the position of the inner conductor part and of the insulation part in the outer conductor part can be at least axially fixed if the inner conductor part is located in the axial end position in the insulation part.

The position of the inner conductor part and of the insulation part in the outer conductor part can however also be fixed in the radial direction. It is also possible for example to provide a radial fixing arrangement even in advance by virtue of a mechanical coding arrangement between the outer conductor part, the insulation part and/or the inner conductor part on the basis of a form-locking connection. Consequently, it is not possible for the components to be unintentionally rotated relative to one another during the assembly procedure and/or during the subsequent use of the cable plug connector.

In one development of the invention, it can be provided that the inner conductor part is inserted into the outer conductor part by virtue of a relative movement between the inner conductor part and the outer conductor part until a front, free end of the inner conductor part has achieved a defined distance measurement from a front end of the outer conductor part that is facing a corresponding mating plug connector.

It can also be provided that the defined axial end position of the inner conductor part in the insulation part is determined by taking into consideration a distance measurement (in practice also referred to as a "connection dimension") of a front, free end of the inner conductor part with respect to the front end of the outer conductor part that is facing a subsequent mating plug connector, if the insulation part is positioned with the inner conductor part in the outer conductor part.

Due to the great flexibility in the case of the orientation of the insulation part, of the outer conductor part and of the inner conductor part relative to one another, it is possible that the connection dimension that is to be maintained during the assembly procedure of the cable plug connector is generally maintained despite great tolerances of the components, wherein simultaneously the electrical properties of the plug connector, in particular with regard to the transmission of data signals in the high frequency industry, can be maintained.

It is possible for the purpose of optimizing the electrical properties of the plug connector for the high-frequency industry to determine the ideal relative positions of the inner conductor part, of the outer conductor part and/or of the insulation part relative to one another on the basis of calculations, test series and/or simulations for the purpose of optimizing the electrical properties of the plug connector for the high-frequency industry.

It can be provided in one development that the position of the inner conductor part and of the insulation part in the outer conductor part is at least axially fixed if the front, free end of the inner conductor part has achieved the defined distance measurement in the outer conductor part.

It can be provided in one development that the position of the inner conductor part and of the insulation part in the outer conductor part is at least axially fixed when the front, free end of the inner conductor part has achieved the defined distance measurement in the outer conductor part.

Furthermore, it is possible in one development of the invention to provide that the inner conductor part and the insulation part are inserted axially into the outer conductor part starting from opposite assembling directions.

In particular, it is possible for the prefabricated electrical cable, or the inner conductor part, to be inserted into a rear end of the outer conductor part that is remote from the subsequent mating plug connector of the cable plug connector, and the insulation part can be inserted into a front end of the outer conductor part that is facing the subsequent mating connector. These processes can be performed simultaneously, or one after the other. Moreover, it does not matter whether the inner conductor part, the insulation part and/or the outer conductor part is, or are, moved in order to insert the inner conductor part and the insulation part into the outer conductor part.

Furthermore, it is possible in an alternative variant of the invention to provide that the inner conductor part and the insulation part are inserted axially into the outer conductor parts preferably simultaneously starting from the same assembly direction.

It is possible to provide that the insulation part is attached to an inner-lying shoulder of the outer conductor part if the inner conductor part and the insulation part are inserted into the outer conductor part starting from the same assembly direction.

It is possible in one development of the invention to provide that the inner conductor part is inserted into the insulation part as far as the defined axial end position prior to the inner conductor part and the insulation part being inserted together into the outer conductor part.

It is preferred that the insulation part, in the case of this variant, is therefore initially plugged onto the inner conductor part and together with the inner conductor part inserted into the outer conductor part.

The insulation part can be plugged loosely onto the inner conductor part. However, it can also be provided that the insulation part latches with the inner conductor part and thus is pre-assembled on the inner conductor part in an axially and/or radially positive-locking manner. It is also possible to provide that the inner conductor part is fixed in the insulation part in a non-positive locking manner or in any other manner. However, it is preferred that the insulation part is plugged in an at least movable manner in the axial direction onto the inner conductor part.

Furthermore, the insulation part can be plugged in a loss-proof manner onto the inner conductor part.

However, it is preferred that the inner conductor part and the insulation part are inserted into the outer conductor part starting from opposite assembling directions.

It can be provided that the outer conductor part is stamped and within the scope of the assembly method fed in by means of a carrier strip that carries multiple outer conductor parts.

In one development of the invention, it can be preferably provided that the inner conductor part and the insulation part are positioned in the outer conductor part using a common (the same) cable fabrication apparatus.

Consequently, it is preferred that all method steps, in particular however the method steps one to three are performed using a common cable fabrication apparatus.

In accordance with the prior art, the procedure of assembling a cable plug connector and the final fabrication of an already prefabricated electrical cable, in particular of a coaxial cable, can be performed in different cable fabrication apparatuses. Within the scope of the development in accordance with the invention, it is possible to reduce the assembly time which is long due to mass production procedures.

Consequently, the procedure of assembling the cable plug connector and also the entire procedure of fabricating the cable can be performed for example using a single cable fabrication apparatus (also referred to as a fabrication machine or a cable fabrication machine).

It is possible in accordance with the invention to reduce the investment costs for a cable fabrication apparatus, in particular the investment costs for a fully automated stamping-bending machine.

It is possible to provide the following assembly steps for assembling a cable plug connector that are preferably performed using a common cable fabrication apparatus: inserting the insulation part into an inner compartment of the outer conductor part of the cable plug connector; after which the insulation part is oriented axially with respect to the outer conductor part of the cable plug connector; after which the inner conductor part is inserted into the insulation part and oriented axially with respect to the insulation part; and after which the insulation part and the inner conductor part are axially fixed in the outer conductor part of the cable plug connector, preferably by means of being pressed thereon or crimped thereon.

Within the scope of the final assembly step, a synthetic housing can be pushed onto the outer conductor part and where appropriate latched with the outer conductor part.

It is possible to provide an inspection window or a cut-out in the outer conductor part in order to monitor and where appropriate control the orientation of the insulation part and/or of the inner conductor part in the outer conductor part during the positioning of the components relative to one another.

A procedure of monitoring the feed-in or positioning of the components relative to one another, for example for a position control facility, can be performed fundamentally using any sensor system and also without an inspection window. For example, it is possible to use contactless sensors (for example, but not limited to, capacitive, inductive and/or optical sensors) and/or measuring probes for detecting the position of the inner conductor part in the insulation part, the position of the inner conductor part in the outer conductor part and/or the position of the insulation part in the outer conductor part.

The invention also relates to a cable fabrication apparatus for assembling a cable plug connector that comprises an outer conductor part, an insulation part and an electrical cable that is prefabricated with an inner conductor part.

The cable fabrication device comprises a positioning facility that is embodied to position the inner conductor part and the insulation part in the outer conductor part.

The positioning facility comprises an actuator facility that is embodied in order to insert the insulation part into the outer conductor part by virtue of a relative movement between the insulation part and the outer conductor part.

Moreover, the cable fabrication apparatus comprises a fabricating facility that is embodied in order to prefabricate the electrical cable prior to or during the procedure of inserting the insulation part into the outer conductor part in such a manner that the inner conductor part is fastened to an inner conductor of the cable.

Moreover, the positioning facility comprises a positioning means that is embodied in order during or after the procedure of inserting the insulation part into the outer conductor part to insert the cable, which is prefabricated with the inner conductor part, as far as a defined axial end position into the insulation part by virtue of a relative movement between the inner conductor part and the outer conductor part that is equipped with the insulation part.

In accordance with the invention, it is possible in order to produce the components, in particular the outer conductor part, to switch to simplified and thus more cost-effective manufacturing methods (for example stamping tools, moulding tools).

In one embodiment of the invention, it is possible to provide that the positioning facility (in particular the actuator facility and the positioning means) and the fabricating facility are synchronized in a cyclic manner within the scope of a time-restricted continuous flow production. In particular, it is possible to provide that the method steps that are performed by means of the actuator facility, the positioning means and the fabricating facility start simultaneously and/or end simultaneously and/or comprise identical cycle times.

It is possible to provide an interlinked conveyor system in order to transport multiple insulation parts, outer conductor parts, inner conductor parts and cable along a conveyor direction one behind the other and thus to provide for the individual method steps or for the simultaneous processing of multiple cable plug connectors (components) by means of the positioning facility and the fabricating facility.

In one development of the invention, it is possible to provide that the cable fabrication apparatus comprises a delivery facility that is embodied to convey the outer conductor part that is equipped with the insulation part into a region of influence of the positioning means in such a manner that the positioning means is able to insert the inner conductor part as far as the defined axial end position into the insulation part.

Within the scope of the unified inventive overall concept for achieving the object, the invention relates to a second cable fabrication apparatus for assembling a cable plug connector, which comprises an outer conductor part, an insulation part and an electrical cable that is prefabricated with an inner conductor part. The second cable fabrication device likewise comprises a positioning facility that is embodied to position the inner conductor part and the insulation part in the outer conductor part.

Furthermore, the positioning facility of the second cable fabrication apparatus also comprises a positioning means that is embodied to insert the inner conductor part in a defined axial position into the insulation part by virtue of a relative movement between the inner conductor part and the insulation part.

Moreover, the second cable fabrication apparatus comprises a fixing facility that is embodied to only fix the position of the inner conductor part and of the insulation part in the outer conductor part after the inner conductor part is located in the axial end position. Also, the first cable fabrication apparatus in accordance with the invention can comprise a fixing facility.

It is preferred that the fixing facility is embodied to fix the position of the inner conductor part, of the outer conductor part and/or of the insulation part with respect to one another, in that the outer conductor part is pressed thereon at least in sections.

By virtue of, in accordance with the invention, inserting the inner conductor part into the insulation part during the assembly procedure of the cable plug connector, it is now possible to coordinate the position of the insulation part precisely with the position of the inner conductor part in the outer conductor part, whereby it is possible to realize positioning accuracies that hitherto could not be achieved.

As soon as the optimal relative positions of the inner conductor part, of the insulation part and of the outer conductor part have been achieved by means of the positioning facility, it is possible by means of a subsequent fixing procedure, in particular a crimping procedure, to fix the position of the cable and consequently the position of the inner conductor part and also the position of the insulation part in the outer conductor part by means of the fixing facility.

It is therefore possible by means of the cable fabrication apparatus, in accordance with the invention, to coordinate precisely the position of the insulation part and the inner conductor part in the outer conductor part.

The actuator facility can comprise an axially movable assembly die and be embodied to position the insulation part axially in the outer conductor part and/or in order to push the insulation part axially over the inner conductor part.

The positioning means can comprise a gripping facility that can be displaced in a linear manner along the longitudinal axis of the outer conductor part in order to position the cable and the inner conductor part that is fastened to the inner conductor of the cable. The gripping facility can comprise in particular one or multiple pressing jaws. The gripping facility grips the cable preferably on the sheath of the cable.

The fixing facility can be embodied for example as a pressing tool, preferably as a crimping tool.

It is preferred that the invention can be provided for assembling a coaxial cable plug connector, in particular for a data plug connector.

However, the invention is not limited to a specific type of plug connector or to a specific plug connector, wherein the invention is suitable in particular for fabricating electrical cables with plug connectors for the high frequency industry. A corresponding plug connector can consequently be preferably embodied as a high frequency plug connector, in particular as a PL-plug connector, BNC-plug connector, TNC-plug connector, SMBA (FAKRA)-plug connector, N-plug connector, 7-16-plug connector, SMA-plug connector, SMB-plug connector, SMS-plug connector, SMC-plug connector, SMP-plug connector, BMS-plug connector, HFM-plug connector, HSD-plug connector, H-MTD-plug connector, BMK-plug connector, Mini-Coaxial-plug connector or Makax-plug connector. This list is not exhaustive of possible embodiments.

The plug connector in accordance with the invention can be used in particular advantageously within a vehicle, in particular within a motor vehicle. Possible application areas include but are not limited to, autonomous driving, driver assist systems, navigation systems, "infotainment" systems, fond-entertainment systems, internet connections and wireless Gigabit (IEEE 802.11ad Standard). Possible applications also relate to high-resolution cameras, for example 4K- and 8K-cameras, sensor systems, on-board computers, high-resolution screens, high-resolution instrument panels, 3D navigation devices and mobile communication devices.

However, the cable plug connector in accordance with the invention is suitable for any applications within the entire electronic industry and it is not to be understood to be limited to the use in the automotive industry.

Features that have already been described in connection with one of the methods in accordance with the invention can also be realized for the cable fabrication apparatuses—and conversely. Moreover, features that have already been described in connection with one of the methods in accordance with the invention can also be understood to relate to the cable fabrication apparatuses—and conversely.

In addition, reference is made to the fact that terms such as "including", "comprising" or "having" do not exclude other features or steps. Moreover, the terms "a" or "the" that refer to a single number of steps or features do not exclude multiple features or steps—and conversely.

SUMMARY

A principal aspect of the invention is a method for assembling a cable plug connector (2) that comprises an outer conductor part (4), an insulation part (3) and an electrical cable (1) that is prefabricated with an inner conductor part (5), characterized in that in a first method step (S1), which starts at a first method point in time (A) and ends at a second method point in time (B), the insulation part (3) is inserted into the outer conductor part (4) by virtue of a relative movement between the insulation part (3) and the outer conductor part (4), wherein in a second method step (S2) prior to or at least in part during the first method step (S1), the electrical cable (1) is prefabricated in such a manner that the inner conductor part (5) is fastened to an inner conductor (11) of the cable (1), and wherein in a third method step (S3) during or after the first method step (S1), the cable (1) that is prefabricated with the inner conductor part (5) is inserted as far as a defined axial end position (P1) into the insulation part (3) by virtue of a relative movement between the inner conductor part (5) and the outer conductor part (4) that is equipped with the insulation part (3), wherein the first method step (S1), the second method step (S2) and the third method step (S3) are performed in a synchronized cyclic manner within the scope of a time-restricted continuous flow production if the second method step (S2) is performed prior to the first method step (S1).

A further aspect of the invention is a method characterized in that the first method step (S1), the second method step (S2) and the third method step (S3) are performed in a synchronized cyclic manner within the scope of a time-restricted continuous flow production, in that the method steps, (S1, S2, S3) start simultaneously and/or end simultaneously.

A further aspect of the invention is a method characterized in that the first method step (S1), the second method step (S2) and the third method step (S3) are performed in a synchronized cyclic manner within the scope of a time-restricted continuous flow production, in that the method steps, (S1, S2, S3) comprise identical cycle times.

A further aspect of the invention is a method characterized in that the position of the inner conductor part (5), of the outer conductor part (4) and/or of the insulation part (3) is fixed in that the outer conductor part (4) is pressed, preferably crimped, at least in sections thereon.

A further aspect of the invention is a method characterized in that prior to the inner conductor part (5) being inserted into the insulation part (3) the insulation part (3) is at least axially fixed in the outer conductor part (4) in such a manner that the insulation part (3) lies against an inner-lying shoulder (12) of the outer conductor part (4).

A further aspect of the invention is a method for assembling a cable plug connector (2) that comprises an outer conductor part (4), an insulation part (3) and an electrical cable (1) that is prefabricated with an inner conductor part (5), wherein the inner conductor part (5) and the insulation part (3) are positioned in the outer conductor part (4), characterized in that the inner conductor part (5) is inserted as far as a defined axial end position ($P_1$) into the insulation part (3) by virtue of a relative movement between the inner conductor part (5) and insulation part (3), wherein the insulation part (3) is only fixed in the axial direction relative to the outer conductor part (4) after the inner conductor part (5) is located in the axial end position ($P_1$) in the insulation part (3), and wherein the position of the inner conductor part (5), of the outer conductor part (4) and/or of the insulation part (3) is fixed with respect to one another, in that the outer conductor part (4) is pressed thereon at least in sections.

A further aspect of the invention is a method characterized in that in order to compensate assembling tolerances, the insulation part (3) remains axially movable in the outer conductor part (4) until the inner conductor part (5) is located in the axial end position ($P_1$) in the insulation part (3).

A further aspect of the invention is a method characterized in that the insulation part (3) is pre-assembled in the outer conductor part (4), preferably pre-assembled in a loss-proof manner, prior to the inner conductor part (5) and the insulation part (3) being positioned relative to one another.

A further aspect of the invention is a method characterized in that the position of the inner conductor part (5) and of the insulation part (3) is at least axially fixed in the outer conductor part (4) if the inner conductor part (5) is located in the axial end position ($P_1$) in the insulation part (3).

A further aspect of the invention is a method characterized in that the inner conductor part (5) is inserted into the outer conductor part (4) by virtue of a relative movement between the inner conductor part (5) and the outer conductor part (4), until a front, free end (5.1) of the inner conductor part (5) has achieved a defined distance measurement (A) from a front end (4.1) of the outer conductor part (4) that is facing a corresponding mating plug connection.

A further aspect of the invention is a method characterized in that the position of the inner conductor part (5) and of the insulation part (3) is at least axially fixed in the outer conductor part (4) if the front, free end (5.1) of the inner conductor part (5) has achieved the defined distance measurement (A) in the outer conductor part (4).

A further aspect of the invention is a method characterized in that the inner conductor part (5) and the insulation part (3) are inserted into the outer conductor part (4) starting from opposite assembling directions.

A further aspect of the invention is a method characterized in that the inner conductor part (5) is inserted as far as the defined axial end position ($P_1$) into the insulation part (3) prior to the inner conductor part (5) and the insulation part (3) being inserted together into the outer conductor part (4).

A further aspect of the invention is a method characterized in that the inner conductor part (5) and the insulation part (3) are positioned in the outer conductor part (4) using a common cable fabrication apparatus (13).

A further aspect of the invention is a cable fabrication apparatus (13) for assembling a cable plug connector (2) that comprises an outer conductor part (4), an insulation part (3) and an electrical cable (1) that is prefabricated with an inner conductor part (5), wherein a positioning facility is provided and embodied in order to position the inner conductor part (5) and the insulation part (3) in the outer conductor part (4), characterized in that the positioning facility comprises an actuator facility (16) that is embodied in order to insert the insulation part (3) into the outer conductor part (4) by virtue of a relative movement between the insulation part (3) and the outer conductor part (4), wherein a cable fabrication apparatus is provided and is embodied in order to prefabricate the electrical cable (1) prior to or during the procedure of inserting the insulation part (3) into the outer conductor part (4) in such a manner that the inner conductor part (5) is fastened to an inner conductor (11) of the cable (1), and wherein the positioning facility comprises a positioning means (14) that is embodied in order during or after the procedure of inserting the insulation part (3) into the outer conductor part (4) to insert the cable (1), which is prefabricated with the inner conductor part (5), as far as a defined axial end position ($P_1$) into the insulation part (3) by virtue of a relative movement between the inner conductor part (5) and the outer conductor part (4) that is equipped with the insulation part (3).

A still further aspect of the invention is a cable fabrication apparatus characterized in that a feed mechanism (17) is provided and embodied in order to move the outer conductor part (4), which is equipped with the insulation part (3) into the region of influence of the positioning means (14) in such a manner that the positioning means (14) is able to insert the inner conductor part (5) as far as the defined axial end position ($P_1$) into the insulation part (3).

An even still further aspect of the invention is a cable fabrication apparatus (13) for assembling a cable plug connector (2) that comprises an outer conductor part (4), an insulation part (3) and an electrical cable (1) that is prefabricated with an inner conductor part (5), wherein a positioning facility is provided and embodied in order to position the inner conductor part (5) and the insulation part (3) in the outer conductor part (4), characterized in that the positioning facility comprises a positioning means (14) that is embodied in order to insert the inner conductor part (5) as far as a defined axial end position ($P_1$) into the insulation part (3) by virtue of a relative movement between the inner conductor part (5) and the insulation part (3), wherein a fixing facility is provided and embodied in order to only fix the position of the inner conductor part (5) and of the insulation part (3) in the outer conductor part (4) after the inner conductor part (5) is located in the defined axial end position ($P_1$) in the insulation part (3).

These and other aspects of the invention will be described and disclosed in detail herein, as is required.

BRIEF DESCRIPTIONS OF THE DRAWINGS

Exemplary embodiments of the invention are explained in detail below with reference to the accompanying Figures.

The Figures illustrate preferred exemplary embodiments in which individual features of the present invention are represented in combination with one another. Features of an exemplary embodiment can also be implemented separately from the other features of the same exemplary embodiment and can accordingly be readily combined by a person skilled in the art to form further expedient combinations and sub-combinations having features of other exemplary embodiments.

Like-functioning elements are provided with the same reference numerals in the figures.

DETAILED WRITTEN DESCRIPTION OF THE PREFERRED EMBODIMENTS

This disclosure of the invention is submitted in furtherance of the Constitutional purposes of the U.S. Patent Laws "to promote the progress of science and the useful arts." (Article 1, Section 8).

Figure 1:
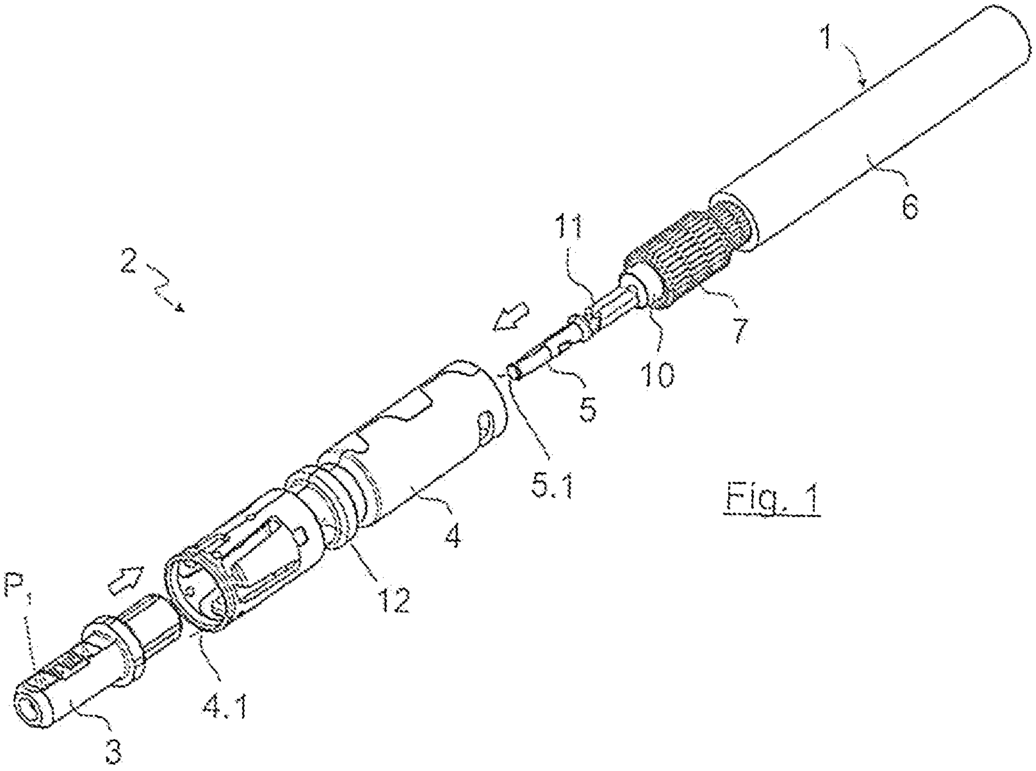
FIG. 1 is a perspective exploded view of a cable plug connector that is to be assembled on an electrical cable within the scope of the method in accordance with the invention and that comprises an outer conductor part, an insulation part and an inner conductor part.
Figure 2:
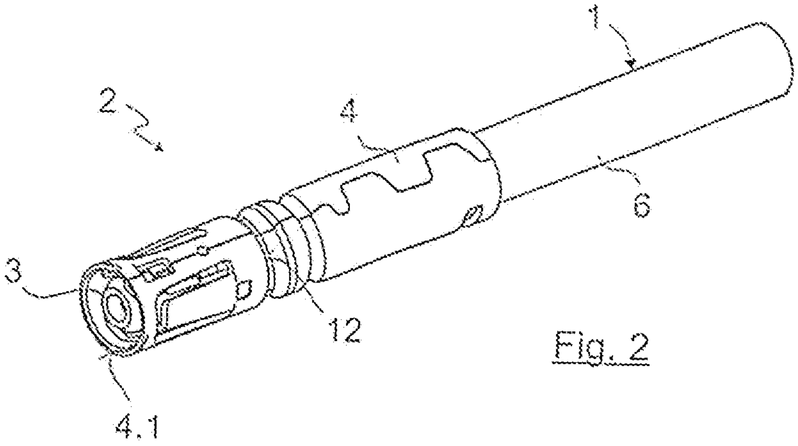
FIG. 2 is a perspective view of the cable plug connector shown in FIG. 1 that is assembled in accordance with the invention on the electrical cable.

FIG. 1 illustrates a perspective exploded view of an electrical cable 1 onto which, in accordance with the invention, a cable plug connector 2 is to be assembled. The cable plug connector 2 comprises an insulation part 3, an outer conductor part 4 and an inner conductor part 5. FIG. 2 illustrates a perspective view of the cable plug connector 2 that is ready assembled on the electrical cable 1.

Figure 8:
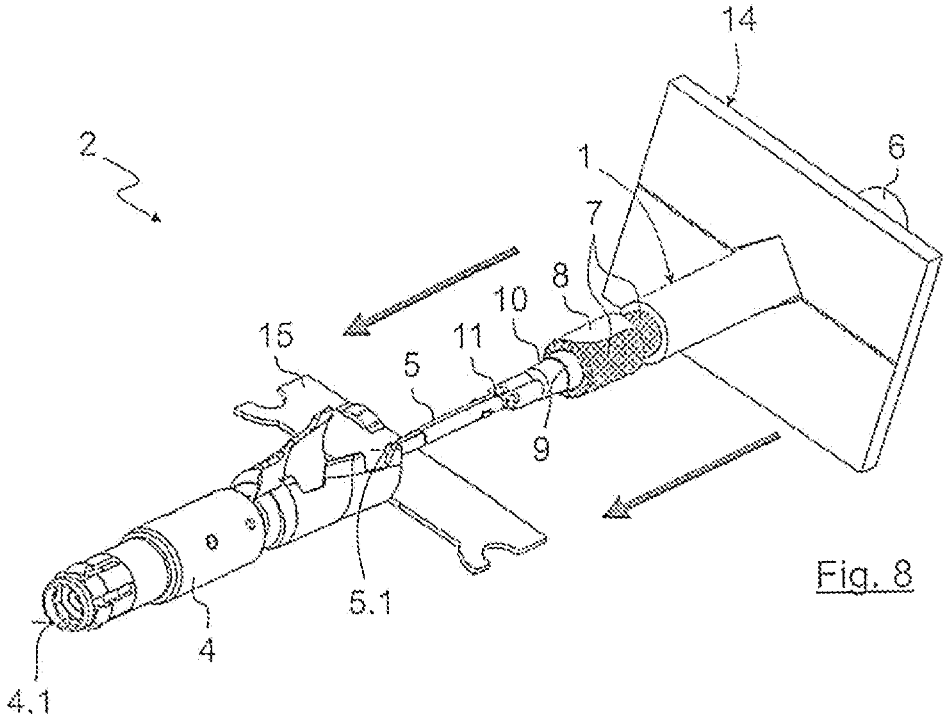
FIG. 8 illustrates a perspective view of the assembly procedure of a further cable plug connector by means of a positioning facility of a cable fabrication apparatus.

The electrical cable 1 is already prefabricated for the assembly procedure. For this purpose, the cable 1 comprises a front section from which a cable sheath 6 has been removed. A support sleeve 8 is fastened, preferably crimped, onto the outer conductor, in the present case a cable shielding braid 7, which is located below the cable sheath 6. Moreover, the outer conductor or the cable shielding braid 7 can be folded back, as illustrated, onto the support sleeve 8. FIG. 8 illustrates the folded-back outer conductor 7 in a section on the support sleeve 8 in order to show the support sleeve 8. In the exemplary embodiments, the support sleeve 8 is positioned on the cable shielding braid 7 of the cable 1 in such a manner that an exposed section of the cable shielding braid 7 still remains between a rear cable-side end of the support sleeve 8 and the cable sheath 6. However, it is fundamentally also possible to provide that the support sleeve 8 is axially positioned on the cable 1 in such a manner that said support sleeve directly adjoins the cable sheath 6. Fundamentally, the support sleeve 8 can also be fastened to the cable sheath 6 or in part to the cable sheath 6.

The electrical cable 1 that is illustrated comprises a cable film 9 that is optionally located below the cable shielding braid 7 (cf. FIG. 8). Moreover, a dielectric 10, in which is guided an inner conductor 11 of the cable 1, is located below the outer conductor or the cable shielding braid 7. Within the scope of the prefabrication procedure, the inner conductor part 5 is fastened, in particular crimped, to the inner conductor 11 of the cable 1.

Within the scope of the method in accordance with the invention for assembling the cable plug connector 2, it is provided that the inner conductor part 5 and the insulation part 3 are positioned in the outer conductor part 4.

Within the scope of the second method in accordance with the invention, it is provided for this purpose that the inner conductor part 5 is inserted, as far as a defined axial end position $P_1$, into the insulation part 3, wherein the insulation part 3 is only fixed in the axial direction relative to the outer conductor part 4 after the inner conductor part 5 is located in the axial end position $P_1$. Subsequently, the position of the inner conductor part 5 and of the insulation part 3 can be fixed in the outer conductor part 4.

In particular, it is possible to provide that the insulation part 3 remains axially movable in the outer conductor part 4 at least so as to compensate assembling tolerances until the inner conductor part 5 is located in the axial end position $P_1$ in the insulation part.

Figure 3:
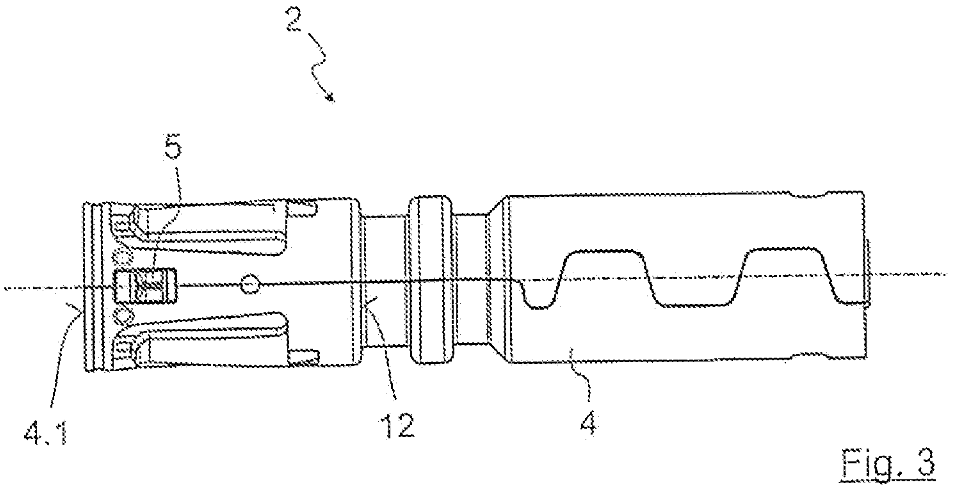
FIG. 3 is an orthographic side view of the cable plug connector shown in FIG. 1 that is assembled in accordance with the invention.

FIG. 3 illustrates a lateral/side view of the assembled cable plug connector 2. Moreover, the cable plug connector 2 is illustrated in a sectional view in FIG. 4, wherein for the sake of a simplified view the cable 1 is hidden in each case in FIGS. 3 and 4.

Figure 4:
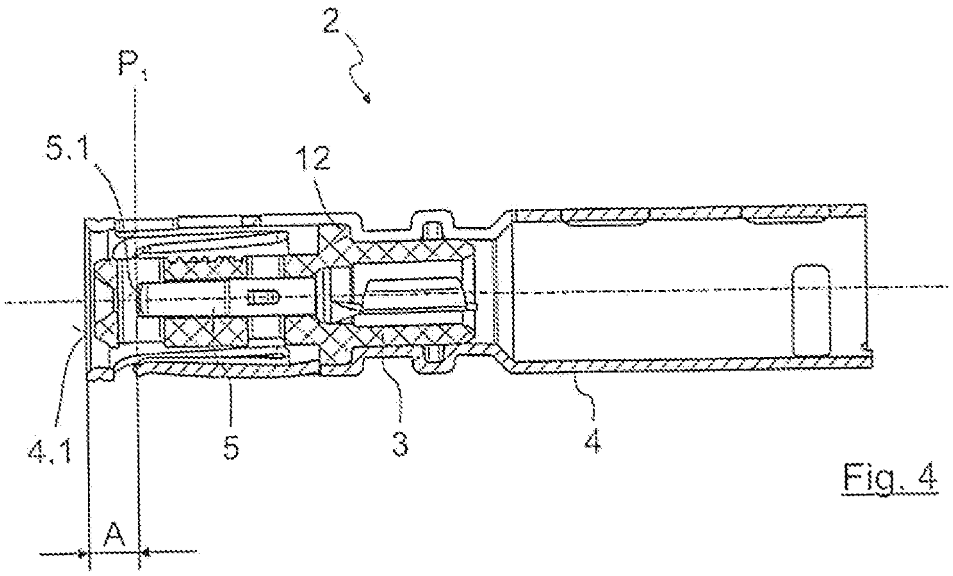
FIG. 4 is an orthographic side cross-section view of the cable plug connector shown in FIG. 1 that is assembled in accordance with the invention.

The defined axial end position $P_1$ of the inner conductor part 5 in the insulation part 3 can be determined taking into consideration a distance measurement or connection measurement A (cf. FIG. 4) of a front, free end 5.1 of the inner conductor part 5 to the front end 4.1 of the outer conductor part 4 that is facing a subsequent mating plug connector (not illustrated) if the insulation part 3 is positioned together with the inner conductor part 5 in the outer conductor part 4. As illustrated in FIG. 4, the insulation part 3 can be optionally joined to an inner-lying shoulder 12 of the outer conductor 4. In particular, within the scope of the second method in accordance with the invention for assembling the cable plug connector 2, the insulation part 3 can however be fundamentally positioned independently of the inner-lying shoulder 12 in such a manner that an advantageous impedance adjustment is performed in the case of the transition from the cable 1 to the cable plug connector 2 and/or in the case of the distance measurement A being maintained.

Within the scope of the invention, the inner conductor part 5 and the insulation part 3 can be inserted axially into the outer conductor part 4 starting from opposite assembling directions as indicated in FIG. 1 and in the following FIGS. 5 to 7. For example, the insulation part 3 can be inserted from the front into the outer conductor part 4 and the inner conductor part 5 can be inserted from the rear into the outer conductor part 4. However, it is also possible to provide that the inner conductor part 5 and the insulation part 3 are inserted axially into the outer conductor part 4 preferably simultaneously starting from the same assembly direction. For this purpose, it is possible for example to position the insulation part 3 on the inner conductor part 5 in advance and subsequently insert it together with the inner conductor part 5 into the outer conductor part 4.

It can be provided that the position of the inner conductor part 5 and of the insulation part 3 in the outer conductor part 4 can be at least axially fixed if the insulation part 3 is located in the axial end position $P_1$. It is possible within the scope of the first method in accordance with the invention to also provide that prior to the inner conductor part 5 being inserted into the insulation part 3 the insulation part 3 is at least axially fixed in the outer conductor part 4 in such a manner that the insulation part 3 lies against the inner-lying shoulder 12 of the outer conductor part 4. The position of the inner conductor part 5, of the outer conductor part 4 and/or of the insulation part 3 can be fixed in that for example the outer conductor part 4 is pressed, preferably crimped, at least in sections thereon.

Fundamentally, all the movements that are described within the scope of the invention are merely a movement of the components 3, 4, 5 relative to one another. For example, it is possible to provide that the inner conductor part 5 is inserted as far as the defined axial end position $P_1$ into the insulation part 3 in that the inner conductor part 5 is inserted into the insulation part 3 and/or in that the insulation part 3 is pushed over the inner conductor part 5.

Figure 5:
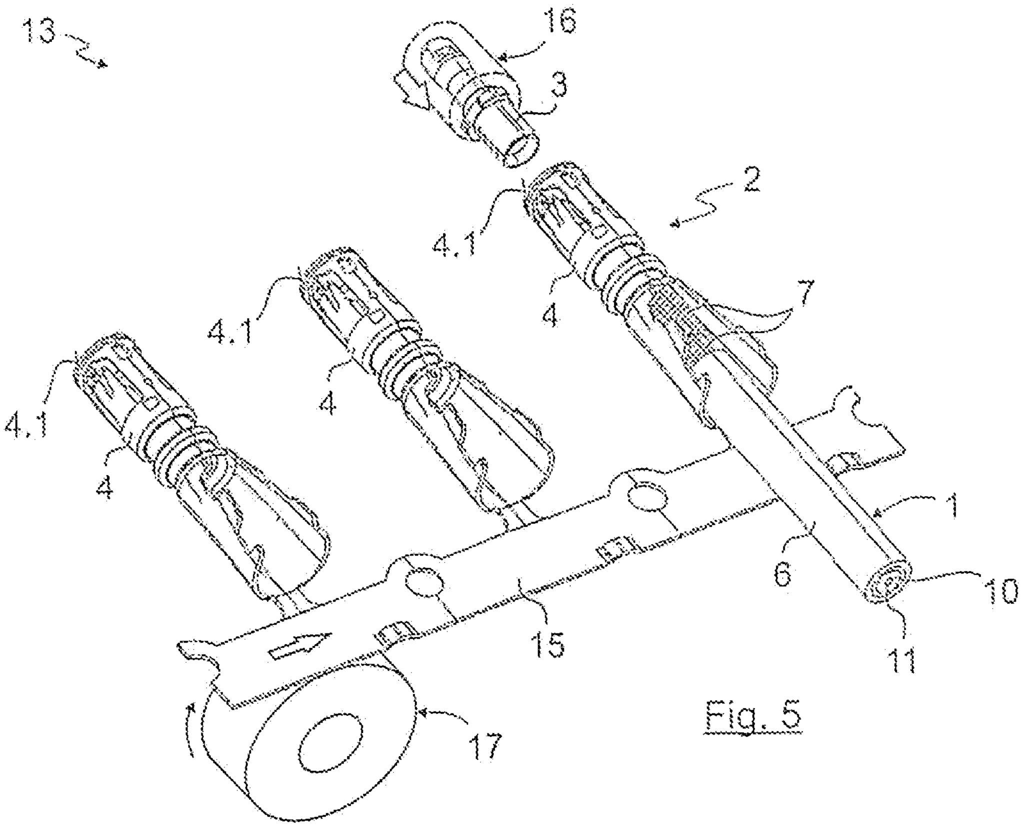
FIG. 5 illustrates a first variant of a method in accordance with the invention for assembling the cable plug connector, wherein initially the inner conductor part of the prefabricated cable is positioned in the outer conductor part and the insulation part is only subsequently inserted into the outer conductor part.
Figure 6:
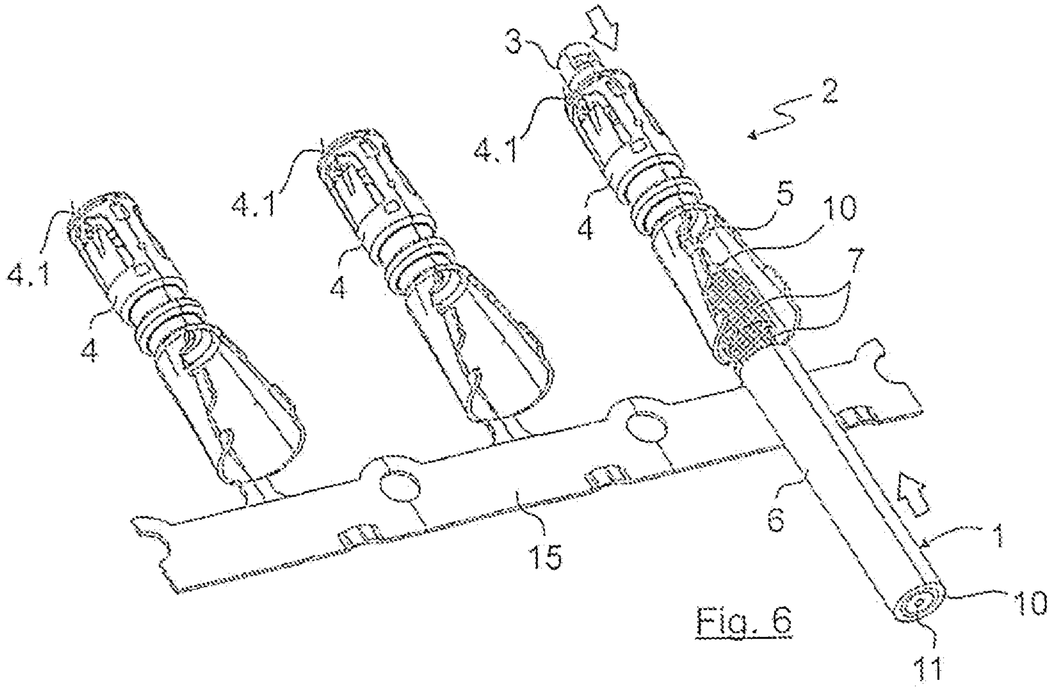
FIG. 6 illustrates a second variant of a method in accordance with the invention for assembling the cable plug connector, wherein the inner conductor part of the prefabricated cable and the insulation part are positioned simultaneously in the outer conductor part.
Figure 7:
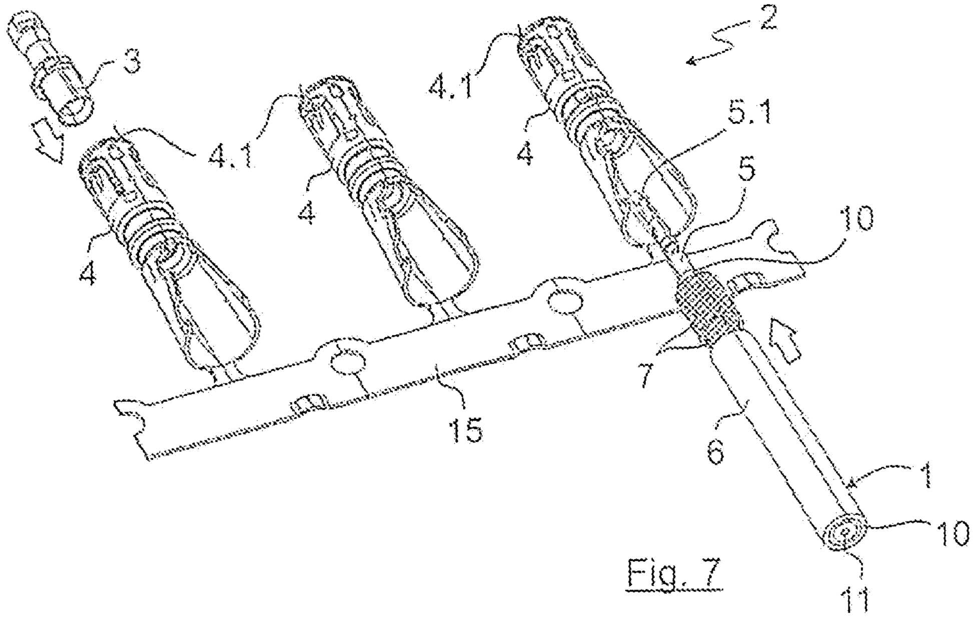
FIG. 7 illustrates a third variant of a method in accordance with the invention for assembling the cable plug connector, wherein initially the insulation part is positioned in the outer conductor part and the inner conductor part of the prefabricated cable is only subsequently inserted into the outer conductor part.

Three variants of the method in accordance with the invention are illustrated in FIGS. 5 to 7. The respective illustrated processing is preferably performed using the same cable fabrication device 13.

In accordance with the variant illustrated in FIG. 5, it is provided that the inner conductor part 5 is already inserted into the outer conductor part 4 prior to the insulation part 3 being likewise inserted into the outer conductor part 4 starting from the opposite assembly direction. The illustrated variant is accordingly suitable advantageously for use with the second method in accordance with the invention.

Moreover, FIG. 5 illustrates a die of an actuator facility 16 that can be fed in and provided for inserting the insulation part 3 into the outer conductor part 4 by means of the positioning facility.

As is likewise illustrated in FIGS. 5 to 7, the outer conductor part 4 can be produced as a stamped outer conductor part 4 and fed in on a carrier strip 15 within the scope of the method for assembling the cable plug connector 2. An optional feed mechanism 17 can be provided for the feed-in procedure, as illustrated in FIG. 5.

FIG. 6 illustrates an alternative variant of the invention, wherein the inner conductor part 5 and the insulation part 3 are inserted simultaneously into the outer conductor part 4. This variant is suitable in a similar manner advantageously for the first and the second method in accordance with the invention. The further apparatus features of FIG. 5 are however not illustrated and described for the sake of simplicity but naturally they can also be advantageously provided for this variant. This also applies for the Figures herein.

FIG. 7 illustrates a third variant of the invention, wherein initially the insulation part 3 is inserted into the outer conductor part 4, after which the inner conductor part 5 is pushed into the outer conductor part. As an option, the insulation part 3 can already be axially fixed in the outer conductor part 4 prior to the inner conductor part 5 being inserted within the scope of the first method in accordance with the invention. The method of performing the prefabrication procedure of the electrical cable 1 and the assembly procedure of the insulation part 3 into the outer conductor part 4 in parallel to one another using the same cable fabrication apparatus 13 can be advantageously realized in particular with respect to this variant of the invention.

Figure 9:
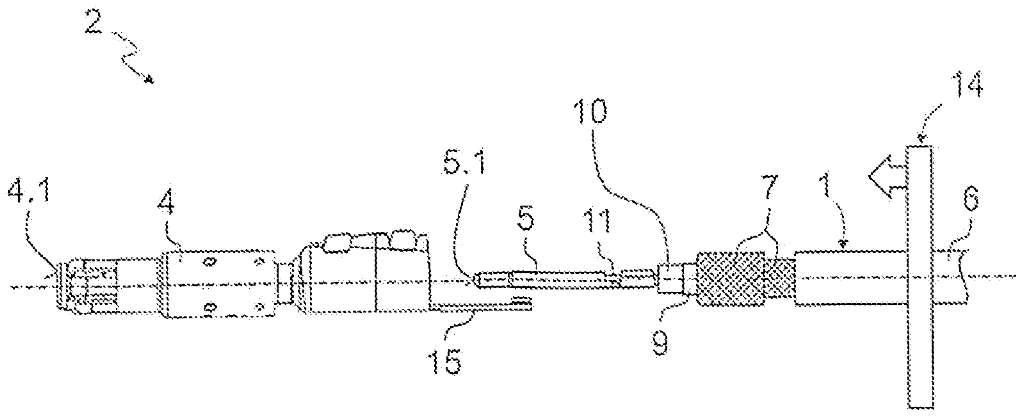
FIG. 9 is an orthographic side view of the assembly procedure of the cable plug connector shown in FIG. 8.

FIGS. 8 and 9 illustrate the assembly procedure, in particular the positioning of the inner conductor part 5 in the outer conductor part 4, in that the insulation part 3 is already prefabricated. The configuration of the outer conductor part 4 deviates in the exemplary embodiment illustrated in the FIGS. 8 and 9 slightly from the outer conductor part 4 that is illustrated in the FIGS. 1 to 7. Fundamentally, the configuration of the outer conductor part 4 can be arbitrary within the scope of the invention.

In accordance with the invention, it is possible to provide a cable fabrication apparatus 13 (cf. in particular the black box in FIG. 11) for the assembly procedure of the cable plug connector 2 that comprises a positioning facility that is embodied in order to position the inner conductor part 5 and the insulation part 3 in the outer conductor part 4. The positioning facility can comprise a positioning means in order to insert the inner conductor part 5 into the defined axial end position $P_1$ into the insulation part 3. In the exemplary embodiment, the positioning means is embodied as an axially movable clamping facility 14. It is fundamentally also possible to provide further positioning means.

It is preferred that the inner conductor part 5 and the insulation part 3 can be positioned in the outer conductor part 4 preferably using a common cable fabrication apparatus 13 that preferably also performs the prefabricating procedure of the electrical cable 1.

Figure 10:
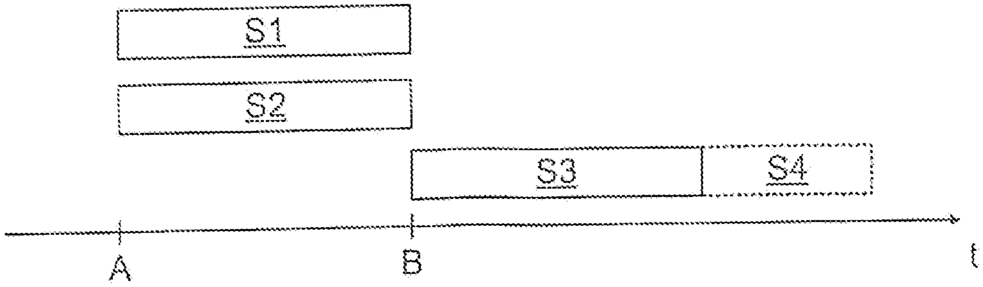
FIG. 10 illustrates an exemplary method sequence for assembling a cable plug connector having three or four method steps.

FIG. 10 illustrates for example a method in accordance with the invention for assembling the cable plug connector 2.

In this case, a first method step S1 is provided that starts at a first method point in time A, and ends at a second method point in time B. Duing the first method step S1, it is provided that the insulation part 3 is inserted into the outer conductor part 4 by virtue of a relative movement between the insulation part 3 and the outer conductor part 4, as illustrated for example in FIGS. 6 and 7.

In a second method step S2, prior to, or at least in part during the first method step S1, the electrical cable 1 is prefabricated in such a manner that the inner conductor part 5 is fastened to the inner conductor 11 of the cable 1. Naturally, it is also possible to provide further assembly steps for prefabricating the electrical cable 1 during the second method step S2, such as for example a step of fastening the support sleeve 8 to the cable shielding braid 7. It is preferred that the method steps S1 and S2 are performed to a great extent in parallel to one another in order to save process time during the entire assembly procedure.

In a third method step S3, during or after the first method step S1, the electrical cable 1 that has been prefabricated with the inner conductor part 5 is inserted, as far as a defined axial end position Pt into the insulation part 3 by virtue of a relative movement between the inner conductor part 5 and the outer conductor part 4 that is equipped with the insulation part 3, as illustrated for example in FIGS. 6 and 7.

As an option, it is possible for example to provide after the third method step S3 that in an optional fourth method step S4 (indicated by the broken line) the inner conductor part 5, the insulation part 3 and/or the outer conductor part 4 are fixed to one another, for example are crimped to one another. It is fundamentally also possible to provide further method steps.

Figure 11:
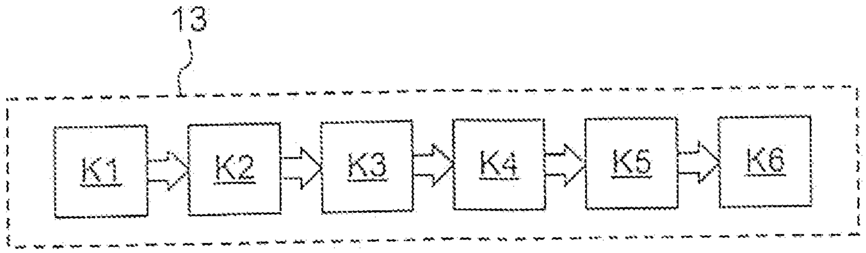
FIG. 11 illustrates a further method sequence for assembling a cable plug connector having supplementary method steps.

FIG. 11 illustrates an exemplary fabricating method within the scope of which it is also possible to provide one of the above described methods for assembling the cable plug connector 2. The fabrication method is preferably performed using a common (the same) cable fabrication apparatus 13.

The fundamentally necessary steps in the case of the fabrication procedure of an electrical cable 1 are known. The arrangement described below is merely to be understood as an example and is sometimes also not described in full.

In a first step K1, it is possible within the scope of the prefabrication procedure to fasten, preferably crimp, the support sleeve 8 to the outer conductor, for example to the cable shielding braid 7, of the electrical cable 1.

Subsequently, in a second step K2 it is still possible within the scope of the prefabrication procedure to fasten, preferably to crimp, the inner conductor part 5 to the inner conductor 11 of the cable 1.

The steps K1 and K2 can consequently be in particular part of the above described second method step S2.

In a third method step K3, the inner conductor part 11 can be inserted in accordance with the invention as far as a defined axial end position $P_1$ into the insulation part 3.

The third step K3 can consequently correspond for example to the third method step S3.

Finally, it is possible, where appropriate, in a fourth step K4 to finely adjust the insulation part 3, the inner conductor part 5 and the outer conductor part 4 relative to one another.

In a fifth step K5, it is possible in accordance with the invention to fix, preferably crimp, the position of the inner conductor part 5 and of the insulation part 3 in the outer conductor part 4.

In an optional sixth step K6, it is possible for example to insert the prefabricated electrical cable 1 into a housing, preferably a synthetic material housing, of the cable plug connector and where appropriate to latch said prefabricated electrical cable into said synthetic material housing.

Operation

Having described the structure of our Method and Cable Fabrication Device for Assembling a Cable Connector, its operation is briefly described.

A principal object of the present invention is a method for assembling a cable plug connector (2) that has an outer conductor part (4), an insulation part (3) and an electrical cable (1) that is prefabricated with an inner conductor part (5), the method comprising the steps: a first method step (S1), which starts at a first method point in time (A) and ends at a second method point in time (B), and in the first method step the insulation part (3) is inserted into the outer conductor part (4) by virtue of a relative movement between the insulation part (3) and the outer conductor part (4), and a second method step (S2) prior to, or at least in part during the first method step (S1), and in the second method step the electrical cable (1) is prefabricated so that the inner conductor part (5) is fastened to an inner conductor (11) of the electrical cable (1); and a third method step (S3), during or after the first method step (S1), and in the third method step the electrical cable (1) that has the fastened inner conductor part (5) is inserted into the insulation part (3) as far as a defined axial end position (P1) by a relative movement between the inner conductor part (5) and the outer conductor part (4); and wherein the first method step (S1), the second method step (S2) and the third method step (S3) are performed in a synchronized cyclic manner within a time-restricted continuous flow production when the second method step (S2) is performed prior to the first method step (S1).

A further object of the present invention is a method wherein the first method step (S1), the second method step (S2) and the third method step (83) are performed in a synchronized cyclic manner within a time-restricted continuous flow production, and the first method step (S1), the second method step (S2) and the third method step (S3) at least one of start simultaneously or end simultaneously.

A further object of the present invention is a method wherein the first method step (S1), the second method step (S2) and the third method step (S3) are performed in a synchronized cyclic manner within the scope of a time-restricted continuous flow production, and the first method step (S1), the second method step (S2) and the third method step (S3) comprise identical cycle times.

A further object of the present invention is a method wherein a position of at least one of the inner conductor part (5), or of the insulation part (3) is fixed in that the outer conductor part (4) is pressed, preferably crimped, at least in sections thereon.

A further object of the present invention is a method and further comprising the step: prior to the inner conductor part (5) being inserted into the insulation part, (3) the insulation part (3) is axially fixed in the outer conductor part (4) in such a manner that the insulation part (3) lies against an inner-lying shoulder (12) of the outer conductor part (4).

A further object of the present invention is a method for assembling a cable plug connector (2) that has an outer conductor part (4), an insulation part (3) and an electrical cable (1) that is prefabricated with an inner conductor part (5), and wherein the inner conductor part (5) and the insulation part (3) are positioned in the outer conductor part (4), comprising the steps: inserting the inner conductor part (5) into the insulation part (3) as far as a defined axial end position ($P_1$) by virtue of a relative movement between the inner conductor part (5) and insulation part (3); and wherein the insulation part (3) is fixed in an axial direction relative to the outer conductor part (4) after the inner conductor part (5) is located in the axial end position ($P_1$) in the insulation part (3); and wherein the position of the inner conductor part (5), of the outer conductor part (4), and of the insulation part (3) is fixed with respect to one another, in that the outer conductor part (4) is pressed thereon at least in sections.

A further object of the present invention is a method wherein the insulation part (3) remains axially movable in the outer conductor part (4) until the inner conductor part (5) is located in the axial end position ($P_1$) in the insulation part (3).

A further object of the present invention is a method wherein the insulation part (3) is pre-assembled in the outer conductor part (4), prior to the inner conductor part (5) and the insulation part (3) being positioned relative to one another.

A further object of the present invention is a method wherein a position of at least one of the inner conductor part (5) or of the insulation part (3) is axially fixed in the outer conductor part (4) if when the inner conductor part (5) is located in the axial end position ($P_1$) in the insulation part (3).

A further object of the present invention is a method wherein the inner conductor part (5) is inserted into the outer conductor part (4) by virtue of a relative movement between the inner conductor part (5) and the outer conductor part (4), until a front, free end (5.1) of the inner conductor part (5) has achieved a defined distance measurement (A) from a front end (4.1) of the outer conductor part (4) that is facing a corresponding mating plug connection.

A further object of the present invention is a method wherein the position of the inner conductor part (5) and the position of the insulation part (3) is axially fixed in the outer conductor part (4) when the front, free end (5.1) of the inner conductor part (5) has achieved the defined distance measurement (A) in the outer conductor part (4).

A further object of the present invention is a method wherein the inner conductor part (5) and the insulation part (3) are inserted into the outer conductor part (4) from opposite directions.

A further object of the present invention is a method wherein the inner conductor part (5) is inserted as far as the defined axial end position ($P_1$) into the insulation part (3) prior to the inner conductor part (5) and the insulation part (3) being inserted into the outer conductor part (4).

A further object of the present invention is a method as wherein the inner conductor part (5) and the insulation part (3) are positioned in the outer conductor part (4) using a common cable fabrication apparatus (13).

A further object of the present invention is a cable fabrication apparatus (13) for assembling a cable plug connector (2) that has an outer conductor part (4), an insulation part (3) and an electrical cable (1) that is prefabricated with an inner conductor part (5), the cable fabrication apparatus comprising: a positioning facility that positions the inner conductor part and the insulator part in the outer conductor part; and wherein the positioning facility has an actuator (16) that inserts the insulation part (3) into the outer conductor part (4) by virtue of a relative movement between the insulation part (3) and the outer conductor part: (4), and wherein the cable fabrication apparatus fabricates the electrical cable (1) prior to or during the inserting of the insulation part (3) into the outer conductor part (4) so that the inner conductor part (5) is fastened to an inner conductor (11) of the electrical cable (1), and the positioning facility has a positioning means that inserts the prefabricated electrical cable (14) as far as a defined axial end position ($P_1$) into the insulation part (3) by virtue of a relative movement between the inner conductor part (5) and the outer conductor part (4) that is equipped with the insulation part (3).

A further object of the present invention is a cable fabrication apparatus (13) and further comprising: a feed mechanism (17) that moves the outer conductor part (4), which has the insulation part (3) into a region of influence of the positioning means (14) so that the positioning means (14) is able to insert the inner conductor part (5) into the insulation part as far as the defined axial end position ($P_1$).

A further object of the present invention is a cable fabrication apparatus (13) for assembling a cable plug connector (2) that has an outer conductor part (4), an insulation part (3) and an electrical cable (1) that is prefabricated to have an inner conductor part (5), the cable fabrication apparatus comprising: a positioning facility to position the inner conductor part (5) and the insulation part (3) in the outer conductor part (4), and wherein the positioning facility has a positioning means (14) to insert the inner conductor part (5) into the insulation part (3) as far as a defined axial end position ($P_1$) by virtue of a relative movement between the inner conductor part (5) and the insulation part (3), and a fixing facility to fix the position of the inner conductor part (5) and of the insulation part (3) in the outer conductor part (4) after the inner conductor part (5) is located in the defined axial end position ($P_1$) in the insulation part (3).

A still further object of the present invention is a method wherein the insulation part (3) remains axially movable in the outer conductor part (4) until the inner conductor part (5) is located in the axial end position ($P_1$) in the insulation part (3).

An even still further object of the present invention is a method wherein the inner conductor part (5) and the insulation part (3) are positioned in the outer conductor part (4) using the same cable fabrication apparatus (13).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalence.

The invention claimed is:

1. A method for assembling a cable plug connector that has an outer conductor part, an insulation part and an electrical cable that is prefabricated with an inner conductor part, and wherein the inner conductor part and the insulation part are positioned in the outer conductor part, comprising the steps:

inserting the inner conductor part into the insulation part as far as a defined axial end position ($P_1$) in the insulation part by virtue of a relative movement between the inner conductor part and insulation part; and fixing, in an axial direction, the insulation part, and the inserted inner conductor part relative to the outer conductor part after the insulating part and the inner conductor part have been inserted into the outer conductor part by crimping, at least in sections, the outer conductor part onto the insulation part so that the position of the inner conductor part, of the outer conductor part, and of the insulation part is fixed with respect to one another.

2. The method as claimed in claim 1, and wherein the insulation part remains axially movable in the outer conductor part until the inner conductor part is located in the axial end position ($P_1$) in the insulation part.

3. The method as claimed in claim 1 and wherein the insulation part remains axially movable in the outer conductor part until the inner conductor part is located in the axial end position ($P_1$) in the insulation part.

4. The method as claimed in claim 1 and wherein the insulation part is pre-assembled in the outer conductor part, prior to the inner conductor part and the insulation part being positioned relative to one another.

5. The method as claimed in claim 1 and wherein a position of at least one of the inner conductor part or of the insulation part is axially fixed in the outer conductor part when the inner conductor part is located in the axial end position ($P_1$) in the insulation part.

6. The method as claimed in claim 1 and wherein the inner conductor part is inserted into the outer conductor part by virtue of a relative movement between the inner conductor part and the outer conductor part, until a front, free end of the inner conductor part has achieved a defined distance measurement (A) from a front end of the outer conductor part that is facing a corresponding mating plug connection.

7. The method as claimed in claim 6, and wherein the position of the inner conductor part and the position of the insulation part is axially fixed in the outer conductor part when the front, free end of the inner conductor part has achieved the defined distance measurement (A) in the outer conductor part.

8. The method as claimed in claim 1 and wherein the inner conductor part and the insulation part are inserted into the outer conductor part from opposite directions.

9. The method as claimed in claim 1 and wherein the inner conductor part is inserted as far as the defined axial end position ($P_1$) into the insulation part prior to the inner conductor part and the insulation part being inserted into the outer conductor part.

10. The method as claimed in claim 1 and wherein the inner conductor part and the insulation part are positioned in the outer conductor part using a common cable fabrication apparatus.

11. The method as claimed in claim 1 and wherein the inner conductor part and the insulation part are positioned in the outer conductor part using the same cable fabrication apparatus.

* * * * *